(12) United States Patent
Skinner et al.

(10) Patent No.: US 6,186,130 B1
(45) Date of Patent: Feb. 13, 2001

(54) MULTICHARGE IMPLEMENTATION TO MAXIMIZE RATE OF ENERGY DELIVERY TO A SPARK PLUG GAP

(75) Inventors: Albert Anthony Skinner; Raymond O. Butler, Jr., both of Anderson, IN (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/359,185

(22) Filed: Jul. 22, 1999

(51) Int. Cl.[7] ................................. F02P 3/05; F02P 5/15
(52) U.S. Cl. ..................... 123/625; 123/637; 123/644
(58) Field of Search ................................. 123/609, 620, 123/625, 644, 637

(56) References Cited

U.S. PATENT DOCUMENTS

| | | | | |
|---|---|---|---|---|
| 4,380,989 | * | 4/1983 | Takaki | 123/644 |
| 5,014,676 | | 5/1991 | Boyer | 123/609 |
| 5,170,760 | * | 12/1992 | Yamada et al. | 123/620 X |
| 5,193,514 | * | 3/1993 | Kobayashi et al. | 123/634 |
| 5,462,036 | | 10/1995 | Kugler et al. | 123/609 |
| 5,758,629 | * | 6/1998 | Bahr et al. | 123/644 |
| 5,886,476 | * | 3/1999 | Skinner et al. | 123/621 X |
| 6,032,657 | * | 3/2000 | Rossi et al. | 123/644 X |

* cited by examiner

*Primary Examiner*—Tony M. Argenbright
(74) *Attorney, Agent, or Firm*—Margaret A. Dobrowitsky

(57) ABSTRACT

An ignition control system for an internal combustion engine includes a control circuit, an ignition coil, a switch, and a sensing circuit. The control circuit is configured to interrupt a primary current, thereby establishing a secondary current which is discharged to cause a spark plug coupled to the secondary winding to produce a first spark. The sensing circuit is configured to generate a secondary current signal representative of a level of secondary current. The control circuit is responsive to the secondary current signal to terminate the discharge by closing the switch to cause the primary current to again flow in preparation of a second spark. The termination of the discharge occurs when the secondary current level reaches a secondary current threshold which is determined as a function of engine speed and ambient temperature.

14 Claims, 3 Drawing Sheets

MULTICHARGE IMPLEMENTATION TO MAXIMIZE RATE OF ENERGY DELIVERY TO A SPARK PLUG GAP

TECHNICAL FIELD

The present invention relates generally to a system for controlling ignition of an air/fuel mixture, and more particularly, to a system for use in generating a plurality of sparks during combustion in an internal combustion engine.

BACKGROUND OF THE INVENTION

There has been much investigation in the ignition art directed to systems for generating multiple spark events during combustion. Such systems are sometimes alternately referred to as "multicharge" systems. Such ignition systems, in particular, are known which provide a succession of spark breakdowns to ensure ignition of a combustible air/fuel mixture introduced into a cylinder of an internal combustion engine. Such systems, ostensibly, provide a series of sparks to increase the number of ignition events and hence the probability of combustion of the air/fuel mixture by extending the time and total energy available for combustion. Conventionally, an ignition coil undergoes an initial charge (i.e., initial dwell) wherein a primary current is established in a primary winding of the ignition coil. The initial dwell is immediately followed by an initial discharge of the ignition coil wherein a secondary current in a secondary winding thereof discharges through a spark plug to generate a first spark. Subsequent recharge intervals (i.e., subsequent dwell periods) follow, accompanied by respective discharge intervals (i.e. spark events). The number of sparks produced is generally determined by a predetermined operating strategy. However, such prior approaches have shortcomings.

One approach taken in the art requires a fixed spark duration (i.e., fixed time for allowing discharge of the secondary current) in combination with a recharge time selected as a predetermined fraction of the initial charge interval (e.g., recharge selected as ¼ of the charge time). Such an approach is stated to have as an advantage the relative efficiency in drawing energy from the main source such as the automotive vehicle battery. Another approach taken in the art also requires a fixed discharge time (i.e., spark duration), but further provides for a recharge interval that is interrupted by a control device when a primary current reaches a predetermined maximum value $I_{MAX}$ (therefore at $I_p=I_{MAX}$) so as to account for relatively high, medium, and small supply (e.g., battery) voltages. Applicants have determined, however, that due to variations in engine operating parameters and environmental factors appurtenant thereto that a fixed discharge time interval does not provide an optimum rate of energy delivery to the air/fuel mixture.

Accordingly, there is a need to provide an ignition control system suitable for use in generating repetitive sparks, that minimizes or eliminates one or more of the shortcomings as set forth above.

SUMMARY OF THE INVENTION

One object of the present invention is to provide an ignition system suitable for use in generating repetitive spark that maximizes energy delivered to an air/fuel mixture in a given time frame.

It is another object of the present invention to reduce power dissipation in one or more electrical components of an ignition system.

It is yet another object of the present invention to provide an ignition system having an increased electrical efficiency.

It is still yet another object of the present invention to provide an ignition system that improves the quality of the combustion event.

These and other objects, advantages, and features of the present invention are realized by a method of controlling ignition in an internal combustion engine in accordance with the present invention. The method involves secondary current sensing and includes five basic steps. The first step involves determining a secondary current threshold. Preferably, the secondary current threshold is determined as a function of an engine speed parameter and an ambient temperature parameter. The secondary current threshold defines the level at which to end secondary current discharge. The second step involves charging an ignition coil by establishing a primary current through a primary winding of the coil. Third, producing a first spark by interrupting the primary current to thereby induce a secondary current in a secondary winding of the coil. The fourth step involves determining the level of the secondary current through the secondary winding. Finally, the fifth step involves recharging the ignition coil by establishing the primary current through the primary winding. This recharging step, which in effect terminates the secondary current discharge, occurs when the secondary current level reaches the secondary current threshold. In a further embodiment, the primary current is thereafter again interrupted to produce a second spark.

An ignition system in accordance with the present invention maximizes the energy delivered to an air/fuel mixture in a given time frame. Maximizing the energy delivery rate improves the quality of the combustion event.

Other objects, features, and advantages of the present invention will become apparent to one skilled in the art from the following detailed description and accompanying drawings illustrating features of this invention by way of example, but not by way of limitation.

DESCRIPTION OF THE PREFERRED EMBODIMENT

Figure 1:
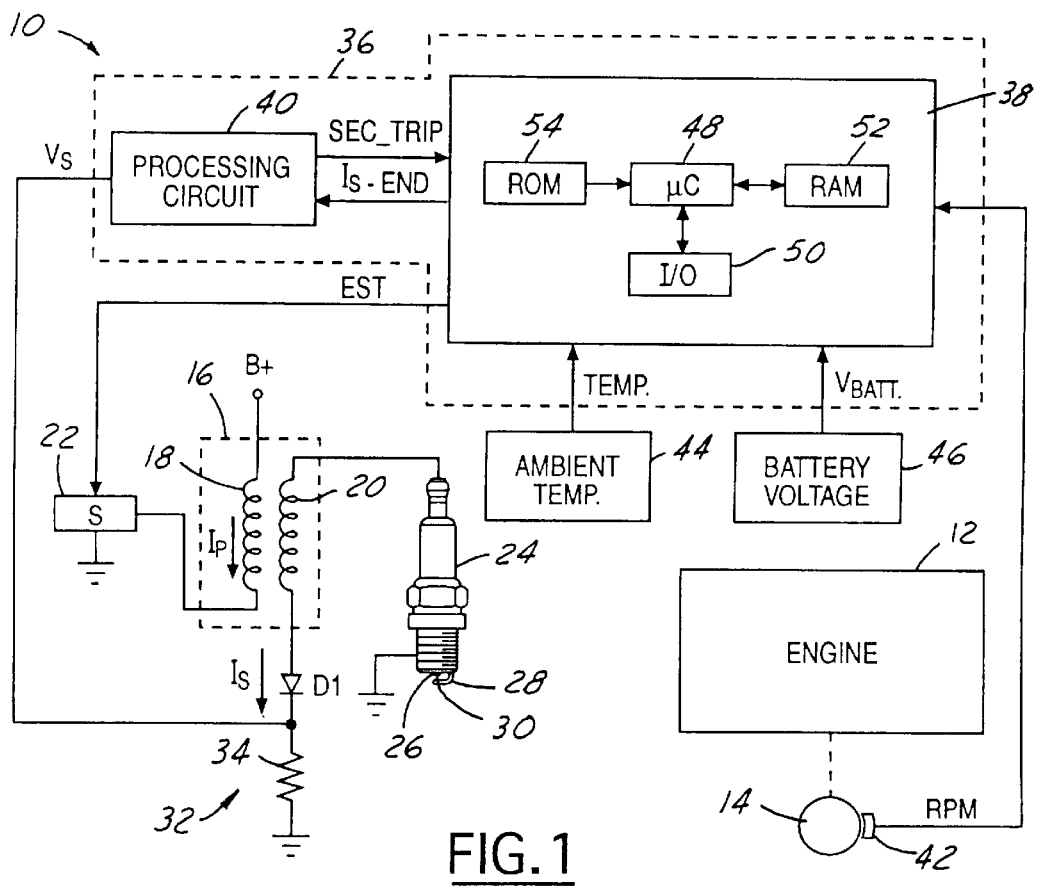
FIG. 1 is a simplified schematic and block diagram of a preferred embodiment in accordance with the present invention.

Referring now to the drawings wherein like reference numerals are used to identify identical components in the various views, FIG. 1 illustrates an ignition control system 10 for an internal combustion engine 12. Engine 12 is of the type having a rotating crankshaft 14 to which are connected a plurality of pistons (not shown) disposed in respective cylinders (not shown) in a manner understood to those in the art. Engine 12 may be of the type having a direct ignition system for initiating combustion.

Before proceeding to a detailed description of ignition control system 10 referenced to the drawings, a general overview of the background and control established by the present invention will be set forth. Control system 10 relates generally to an ignition system for generating repetitive spark during a combustion event of an internal combustion engine. Systems of this type are alternately known as "multicharge" systems, since an ignition coil portion must be charged and recharged multiple times to produce a corresponding number of sparks. Such systems may be characterized by the amount of energy delivered by the ignition system in a specified time frame (i.e., during the combustion event). To maximize the energy delivered, which is desirable to improve combustion, the overall energy delivery rate needs to be defined and optimized. The "energy" delivered per pulse (i.e., spark event), is defined, generally, by the product of two factors: (i) the power being delivered (i.e., V*I=J/sec.) by the spark; and, (ii) the time (sec.) during which the discharge occurs. In the context of a spark event, the spark gap voltage or discharge voltage (i.e., V) must be characterized versus secondary current ($I_s$) and time (i.e., discharge time). Once the "energy" per pulse has been determined, it can be divided by the sum of the recharge time and the discharge time to obtain an effective energy delivery rate.

As further background, conventional multicharge systems have typically assumed a constant voltage gap; however, this assumption does not comport with reality in a spark plug gap in an internal combustion engine. In particular, the spark gap voltage is inversely proportional to the spark current. At engine speeds above idle, the arc is stretched out by the mixture motion at or around the gap. The foregoing factors yield a spark gap voltage that increases as the discharge continues. The peak power, therefore, is not always at the beginning of the discharge, as one might conclude in accordance with conventional "constant" gap voltage models (i.e., inasmuch as the secondary current commences at its maximum, then declines, a constant voltage throughout discharge would result in a peak power being delivered at the very beginning of a spark). On the contrary, as engine speed increases, so does the stretch of the arc. Therefore, at such increased engine speeds, the peak power may actually occur near the very end of the discharge.

Another factor that affects the overall energy delivery rate is the recharge time per pulse. It should be understood that while energy is being stored (i.e., not delivered) in the ignition coil as primary current increases through the primary winding, energy is delivered only during the discharge interval. The overall rate of energy delivery, as referred to above, is therefore as follows: (energy delivered per pulse)/ (recharge time+discharge time). For example, based on a predetermined amount of energy being delivered, an increase in the recharge time is operative to decrease the overall rate of delivered energy. In practical implementations, Applicants have discovered that at high temperatures, the coil and wiring harness resistances have more of an effect on the charge (and recharge) time than at relatively lower temperatures, and affect the rate of charge versus current as well. For example, it takes longer to recharge from $I_p$=10 A to 12 A, than it does from $I_p$=8 A to 10 A. In addition, also relevant to energy delivery, is the rate at which energy is stored in the ignition coil (and therefore available for delivery) versus the primary current level. With typical "pencil" type ignition coils, the energy increases as a function of the square of the primary current for only the first 20–30% of a full charge cycle; beyond that, the energy stored is fairly linear with respect to primary current.

For a given engine condition with a predetermined ignition coil, the discharge voltage at the spark gap can be reduced to a function of the value of the secondary current at which discharge ends. In addition, defining the level of secondary current at which discharge ends substantially defines the starting, primary current level for the next recharge cycle. Based on these relationships, the energy delivered per pulse, the recharge time to a predetermined primary current $I_{p-MAX}$, and the discharge time can all be calculated versus the level of secondary current at which discharge ends, hereinafter designated $I_{s-END}$. As described in detail hereinafter, these relationships may be used to identify an ending secondary current which maximizes the energy delivery rate.

With this background, and now referring to FIG. 1, control system 10 includes an ignition coil 16 comprising primary winding 18 and secondary winding 20, a switch 22, a spark plug 24 comprising a first electrode 26 and a second electrode 28 spaced therefrom to define a gap 30, a sensing circuit 32 comprising a resistor 34, a control circuit comprising a controller 38 and a processing circuit 40, a speed sensor 42, a temperature sensor 44, and a battery voltage sensor 46. In addition, apparatus 10 may include a diode D1.

Ignition coil 16 is configured to function as a selectively controllable step-up transformer. One end, such as the high side end, of primary winding 18 is connected to a supply voltage provided by a power supply, such as a vehicle battery (not shown), hereinafter designated "B+" in the drawings. Supply voltage B+ may nominally be approximately 12 volts. A second end of primary winding 18 opposite the high side end is connected to switch 22. A first end of secondary winding 20, namely the high side end, is coupled to spark plug 24. A second end of secondary winding 20 opposite the high end, namely the low side end, is connected to a ground node through diode D1 and sensing resistor 34. Primary winding 18 and secondary winding 20 are matched in a predetermined manner known in the art. In the illustrated embodiment, one ignition coil 16 is provided per plug 24.

Switch 22 is provided to selectively connect primary winding 18 to ground, in accordance with a control voltage comprising an ignition control signal EST (electronic spark timing). Such a connection to ground, as is known generally in the art, will cause a primary current 4 to flow through primary winding 18. Switch 22 is illustrated in the Figures as a block diagram; however, it should be understood that switch 22 may comprise conventional components known to those of ordinary skill in the art, such as, for purposes of example only, an insulated gate bipolar transistor (IGBT). It should be understood that switch 22 may comprise alternative conventional components known in the art.

Coil 16 and switch 22, together, define the means for selectively storing energy, preferably in a predetermined amount, and thereafter transferring the stored energy to spark plug 24 in accordance with the ignition control signal EST.

Spark plug 24 is disposed in engine 12 proximate a cylinder thereof, and is configured to produce a spark across gap 30. The spark event, as is generally understood by those of ordinary skill in the art, is provided to ignite an air and fuel mixture introduced into the cylinder. During the spark event, a secondary current, designated $I_s$, flows across gap 30 through plug 24 through secondary winding 20 and thence to ground by way of diode D1 and resistor 34.

Control circuit 36 is configured generally to perform a plurality of functions, including generation of ignition control signal EST. It should be understood that the ignition control signal EST may be generated or initiated by other control units, such as a powertrain control module (PCM) (not shown) in accordance with known ignition control strategies, and provided to control circuit 36, such that control circuit 36 responds by driving switch 22 to closure in response thereto. Moreover, control circuit 36 may be an ignition control circuit which receives the ignition control signal EST from another control circuit (e.g., PCM), wherein the received EST signal defines the initial charging time (e.g., duration), and the relative timing (e.g., relative to cylinder top dead center) of when the initial spark is to occur. Under such a configuration, the control circuit 36 is configured to drive switch 22 in accordance with the received ignition control signal EST, but is further configured to thereafter generate the drive signals to switch 22 required for subsequent recharge/discharge (spark) cycles of ignition coil 16. These and other variations of control circuit 36 are within the spirit and scope of the present invention, which is limited only by the appended claims.

Sensing circuit 32, such as sensing resistor 34, is illustrated as being coupled to secondary winding 20 and is configured to generate a secondary current signal, designated $V_s$. The secondary current signal is representative of the level of secondary current in secondary winding 20.

Control circuit 36, in the illustrated embodiment, is further configured to discontinue the ignition control signal EST to switch 22. This action interrupts the primary current $I_p$ and establishes a secondary current in secondary winding 20. The secondary current $I_s$ is configured to cause spark plug 24 to produce a spark across gap 30. Control circuit 36 is responsive to the secondary current signal $V_s$ to terminate secondary current discharge when the secondary current $I_s$ reaches the secondary current threshold level, $I_{s\text{-}END}$. Control circuit 36 is configured to achieve the described termination of the secondary current by generating an active ignition control signal EST to switch 22, ostensibly in preparation of the next spark.

In the illustrated embodiment, which is a programmed computing device embodiment, control circuit 36 includes controller 38 which has computing capability, and processing circuit 40. Controller 38 may comprise conventional components, and may include a standard processing core 48, input/output (I/O) circuitry 50, a random access memory (RAM) 52, and a read only memory (ROM) 54. As is well known, conventional element ROM 54 may be provided for read only storage of program instructions, data constants and calibration values. Processing core element 48 may be provided for reading and executing program instructions stored in ROM 54 for carrying out the control established by the present invention. RAM 52 may be usefully employed for storage of data of the type which may be cleared when, for example, ignition power is removed.

In accordance with the present invention, controller 38 includes predetermined data stored in memory, such as ROM 54. The predetermined data comprises a map, a data structure well known to those of ordinary skill in the ignition art. The map includes a plurality of secondary current threshold values $I_{s\text{-}END}$. In a preferred embodiment, each secondary current threshold value $I_{s\text{-}END}$ stored in the map has a respective engine operating speed (RPM) value and ambient temperature (TEMP) value associated therewith. The engine speed and temperature parameter values may be used as indices to traverse the map for selecting and retrieving one of the secondary current threshold values $I_{s\text{-}END}$. A method for populating the map will be described in detail hereinafter.

Processing circuit 40 is configured to generate a signal designated "SEC_TRIP" when the secondary current signal ($V_s$) reaches a secondary current threshold $I_{s\text{-}END}$ provided thereto by controller 38. Controller 38 is configured, in particular, to discontinue discharge (i.e., terminate spark) of the secondary current upon receipt of the SEC_TRIP signal. Moreover, controller 38 is configured to determine, and preferably to select from the above-described map contained in ROM 54, a secondary current threshold $I_{s\text{-}END}$ as a function of engine speed (RPM), and ambient temperature (TEMP). In yet another embodiment, controller 38 is configured to bias the $I_{s\text{-}END}$ END signal as a function of a battery level voltage ($V_{BATT}$).

Engine speed sensor 42 may comprise conventional components known to those of ordinary skill in the art. For example, it is known to configure crankshaft 14 with a ferrous disc with notches spaced at predetermined intervals along the circumference thereof, and further to provide sensor 42 as a non-powered, variable reluctance inductance type sensor. The notches pass beneath the sensor as the crankshaft turns, generating a signal indicative of engine speed. It should be understood by those of ordinary skill in the art that in such a known system, interface circuitry may be required to condition and format the raw speed indicative signal to a form suitable for use by controller 38.

Ambient temperature sensor 44 may also comprise conventional components known to those of ordinary skill in the art. Battery voltage sensor 46 may also comprise conventional components known to those of ordinary skill in the art.

Figures 2A, 2B:
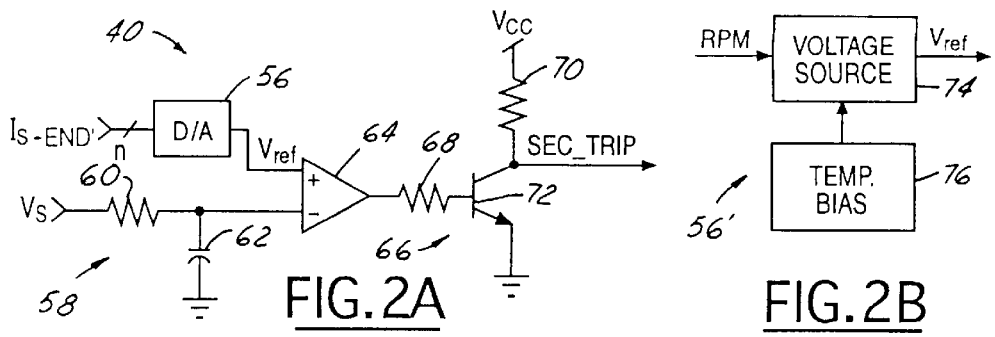
FIG. 2A is a simplified schematic and block diagram view showing, in greater detail, the processing circuit shown in block diagram form in FIG. 1 including a first embodiment of a reference signal generating circuit.
FIG. 2B is a simplified block diagram view of a second embodiment of a reference signal generating circuit.

FIG. 2A shows, in greater detail, one embodiment of processing circuit 40 shown in block diagram form in FIG. 1. Processing circuit 40 may include a reference signal generator, such as a digital-to-analog (D/A) converter 56, a filter 58 comprising a resistor 60 and a capacitor 62, a comparator component 64, and a drive circuit 66 comprising resistors 68, 70 and a transistor 72. In the illustrated embodiment, the secondary current threshold $I_{s\text{-}END}$ (the level of the secondary current at which discharge is terminated) comprises a digital word having n bits. Controller 38 retrieves, in accordance with its programming, as a function of engine speed and temperature, a selected one of the plurality of secondary current threshold parameters $I_{s\text{-}END}$. Reference signal generator 56 converts the secondary current threshold $I_{s\text{-}END}$ from digital form into an analog reference signal, designated $V_{REF}$. In operation, the output of processing circuit 40, which is the secondary current trip signal SEC_TRIP, is a logic high when the discharge of ignition coil 16 commences. This is because comparator 64 is outputting a logic low which keeps transistor 72 off, allowing the SEC_TRIP line to be pulled up to a logic high. When the level of secondary current $I_s$ decays to the selected threshold level $I_{s\text{-}END}$, comparator 64 outputs a logic high drive signal to turn on transistor 72, which in turn pulls the collector terminal thereof down to ground (logic 0). The SEC_TRIP signal thus transitions to a logic low. That is, comparator 64 switches states (low to high) when $V_s$ falls below $V_{ref}$. Controller 38 is configured to respond to the above-described change in the secondary trip signal SEC_TRIP to terminate discharge of the secondary current $I_s$ by reestablishing the primary current. This is done by commanding that switch 22 be closed.

FIG. 2B shows an alternate embodiment for the reference signal generator 56, namely, reference signal generator 56?. In this embodiment, a voltage source 74 is provided that decreases its output $V_{REF}$ with increasing engine speed (RPM). In addition, source 74 also shifts its output $V_{REF}$ downward with increasing temperature, an indication of which may be provided by a temperature bias circuit 76. For example, an R-C (resistor-capacitor) type network may be configured to provide a satisfactory temperature bias so as to change the output $V_{REF}$ in accordance with changes in temperature. That is, the inherent changes in the R-C value, which may vary with respect to temperature, may be used to approximate the desired temperature bias change. The embodiment of FIG. 2B would allow implementation of the invention at a reduced cost, and allow implementation in an embodiment without the computing capability needed to use a look-up table to retrieve the secondary current threshold values $I_{s\text{-}END}$ (i.e., secondary current endpoint).

Figure 3:
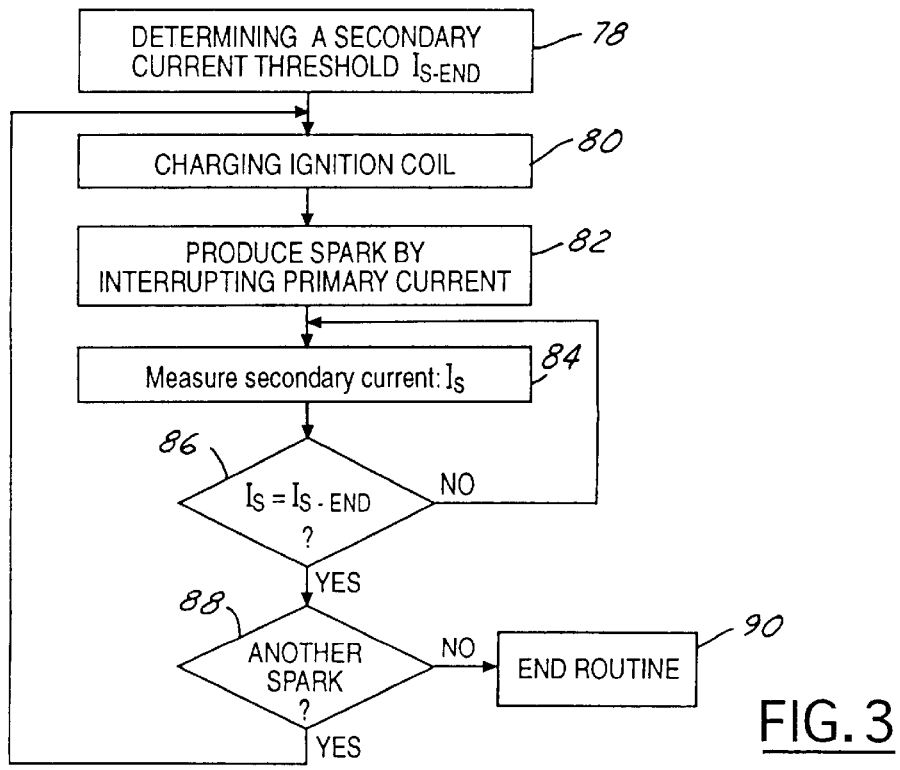
FIG. 3 is a flowchart diagram illustrating a method for controlling ignition in accordance with the present invention.

FIG. 3 is a simplified flow chart diagram illustrating operation of the invention. In step 78, control circuit 36 determines a secondary current threshold, $I_{s\text{-}END}$, as a function of ambient temperature TEMP, and engine speed, RPM. Table 1 below contains a plurality of secondary current threshold values organized as a function of ambient temperature and engine speed.

TABLE 1

Optimum Secondary Current to End Discharge for a Test Engine with a Multicharge Coil with 165 mA Peak Secondary Current

| Ambient Temp (C.) | 600 ERPM (mamp) | 1300 ERPM (mamp) | 2000 ERPM (mamp) | 2700 ERPM (mamp) | 3400 ERPM (mamp) |
|---|---|---|---|---|---|
| −40 | 140 | 115.4 | 60.8 | 49 | 47 |
| 5 | 140 | 102.7 | 50.4 | 42 | 40 |
| 40 | 140 | 90 | 40 | 35 | 33 |
| 75 | 125 | 77.3 | 29.6 | 28 | 26 |
| 140 | 67.2 | 48.25 | 29.3 | 27.5 | 25.5 |

Figure 4:
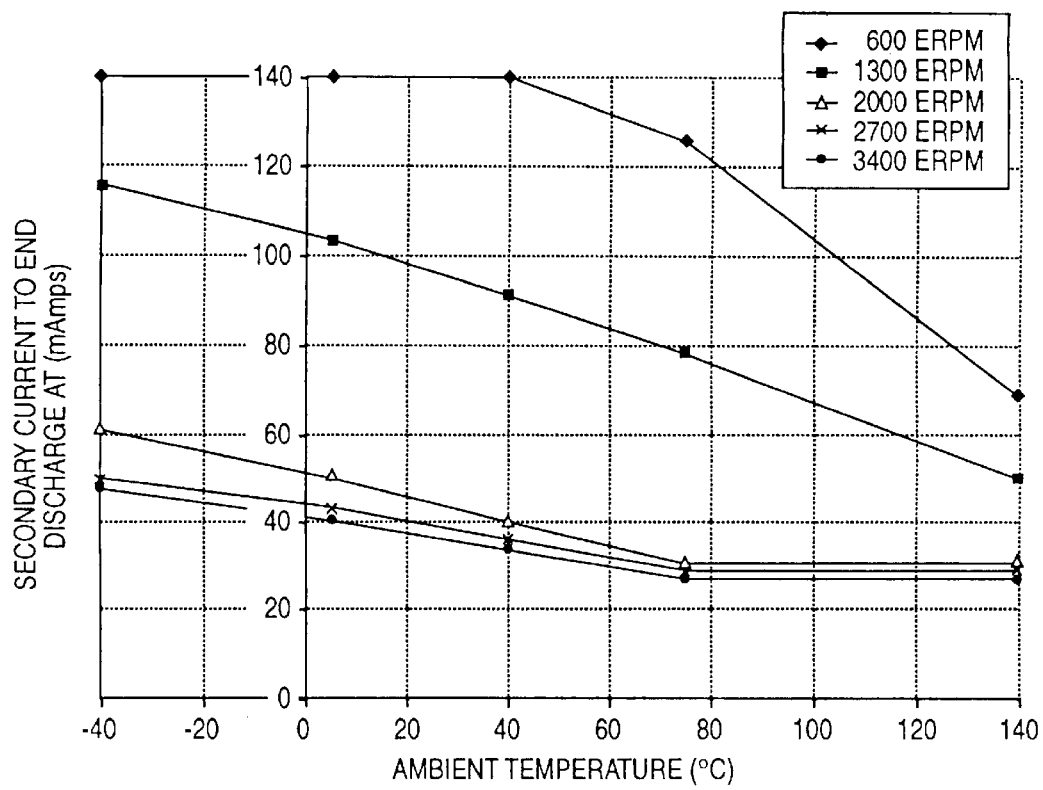
FIG. 4 is a simplified secondary current threshold-versus-temperature graph for a plurality of engine operating speeds in accordance with the present invention.

The data contained in Table 1 are shown graphically in FIG. 4. In the illustrated embodiment, control circuit 36, particularly controller 38, determines which value to select based on temperature information from, for example, sensor 44, and engine speed information from, for example, sensor 42. The data in Table 1, and illustrated in FIG. 4, are predicated on a 165 mA peak secondary current. For example, at 75? C. ambient temperature, and 2000 engine RPM, the selected secondary current threshold $I_{s\text{-}END}$ will be 29.6 mA. Control circuit 36 will therefore permit secondary current discharge through plug 24 from 165 mA nominal peak to approximately a 29.6 mA ending current level. It should be understood that intermediate values may be obtained by interpolation, or the like. Table 1 does not contain data for engine speeds above 3400 RPM, since in the described embodiment, multicharging is not implemented at engine speeds in excess of 3400 RPM (e.g., only one spark is generated). This control strategy decision, however, does not limit the general application of the present invention.

To populate the map, engine measurements are compiled at various speeds, loads and temperatures. Measurements preferably should be taken with ignition coil 16 of the type that is to be optimized in connection with engine 12. With the engine measurements, the discharge voltage as a function of time, RPM, and load can be determined. If secondary current is to be varied by primary current or coil design on engine measurements, then the variance of the discharge voltage with respect to the initial secondary current can also be analyzed. If such data is not available, it may be assumed that the voltage varies inversely with the current to the power of 0.35. As described above, for a given engine condition and given coil, the discharge voltage can be reduced to a function of the secondary current at which discharge ends, herein designated $I_{s\text{-}END}$. Knowing the current at which the discharge ends substantially defines starting primary current for the next charge cycle. With the foregoing information, the energy delivered per pulse, the recharge time to a given primary current, and the discharge time can all be calculated versus the level of secondary current at which discharge ends.

Figure 6:
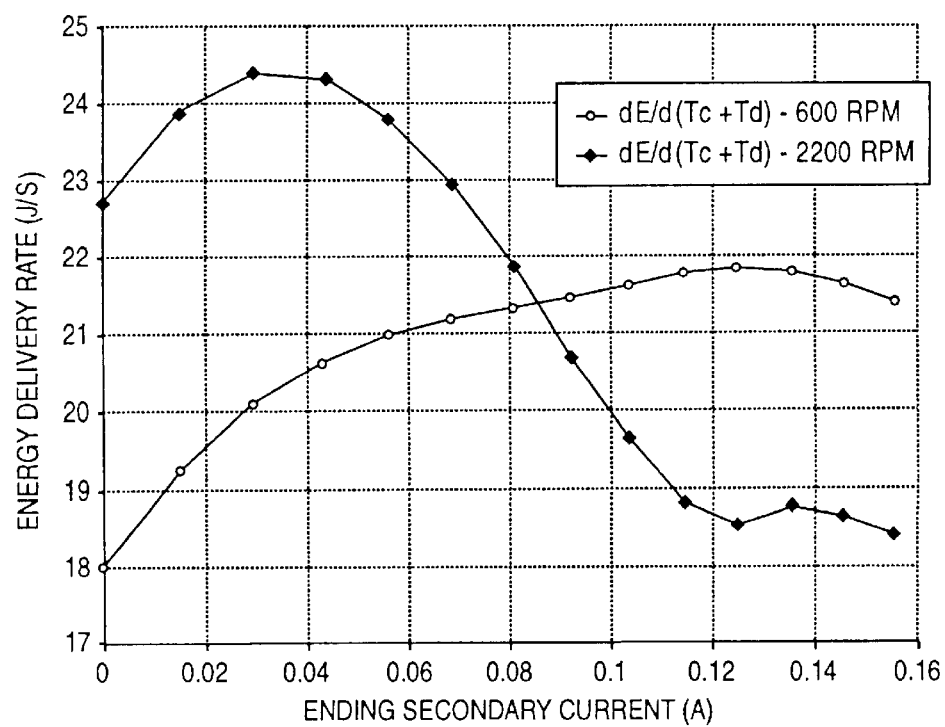

Referring now to FIG. 6, the level at which the secondary current is terminated can be varied, and the resulting data can be recorded and analyzed. From this recorded data, for a given temperature, an optimum secondary current threshold (e.g., end point) may be determined for a given speed. For example, FIG. 6 shows data for two discrete engine speeds, based on a certain temperature (primary coil–105? C.), and primary current ($I_{pMAX}$= 12 A). For an engine speed equal to 2200 RPM, FIG. 6 shows that a maximum energy delivery rate occurs when the secondary current discharge is ended between about 0.03 A–0.05 A. A value in this range can thus be selected for $I_{s\text{-}END}$. for that particular combination of engine speed and temperature. The remainder of the map can be "populated" in a like fashion.

In evaluating the overall rate of energy delivery in accordance with the invention, several observations may be made. First, the optimum time to turn the discharge off and start the recharge of the primary winding varies generally as a function of engine speed and temperature. Second, at relatively high engine speeds, it is preferable to let the discharge continue to a value that substantially dissipates the stored energy. This is shown in FIG. 4, for example, for the 2,000 ERPM, 2,700 ERPM, and 3,400 ERPM engine speed levels, wherein most of the data points above 40? C. ambient temperature fall in the range of 20–40 mA, based on a 165 mA peak secondary current. Third, at low speeds, and low temperatures, preferably, the discharge is terminated relatively near the peak secondary current (e.g., at 600 ERPM, and 40? C. ambient, the secondary current is allowed to discharge from a peak of 165 mA to 140 mA). Finally, at higher temperatures, even at lower speeds, it is better to let the discharge continue. The secondary current threshold parameter values $I_{s\text{-}END}$ contained in the map define the optimum secondary current level at which to end the discharge, as a function of engine conditions and temperature. The values contained in the "map" may be usefully employed to define a "trip" point to end the discharge. As indicated above, the exact slope of the curves depend, in part, on the bum/flow characteristics of the engine type (i.e., which in turn affects the mixture motion, and thus the arc stretch). Further, the shift based on temperature is dependent, in part, on the electrical characteristics of ignition coil 16 and the wiring harness appurtenant thereto.

Figure 5A:
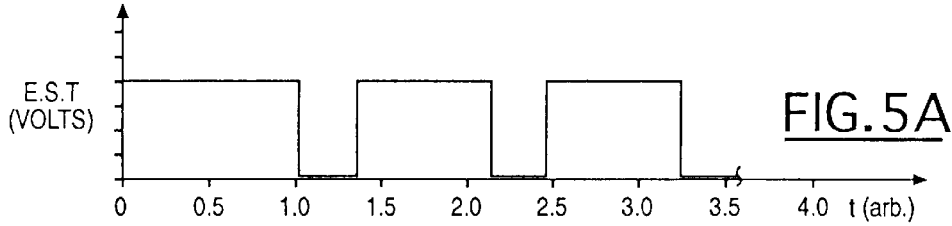
FIGS. 5A–5E are timing diagram views corresponding to the operation of the present invention; and, FIG. 6 is a simplified energy delivery rate-versus-ending secondary current graph.
Figure 5B:
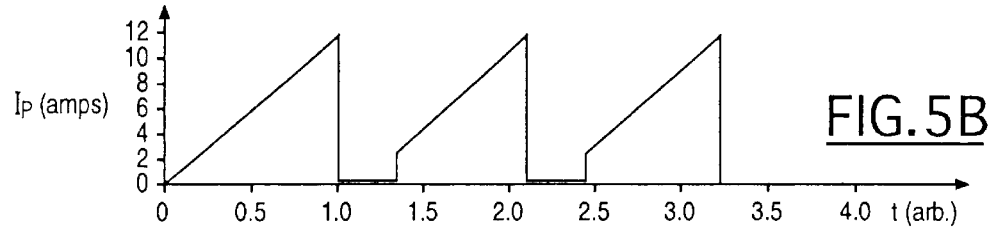

With continued reference to FIG. 3, in step 80, control circuit 36 is operative to begin charging of ignition coil 16. In the illustrated embodiment, ignition control signal EST is applied to switch 22 as a positive going pulse having a duration corresponding to a desired primary ignition coil charge time. Charging commences at the time of receipt of a rising (positive going) edge of the EST signal. This is shown in FIGS. 5A, and 5B. Note that $I_p$ increases generally when the EST signal is in an active state.

Figure 5C:
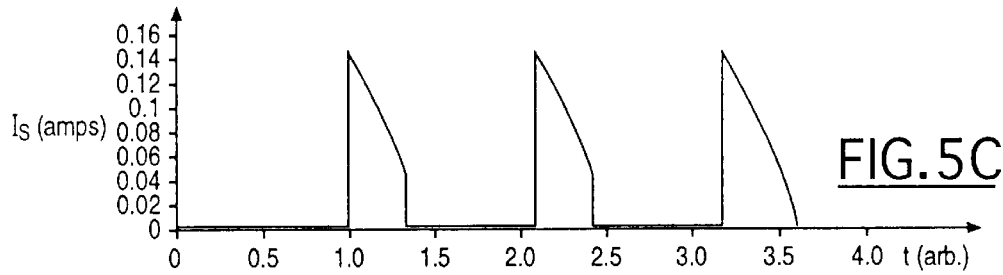
Figure 5D:
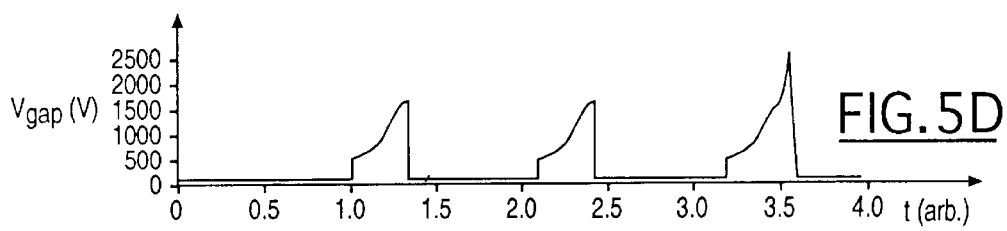

In step 82, ignition coil 16 is controlled, via switch 22, to interrupt primary current $I_p$, thereby producing a spark. In particular, in the illustrated embodiment, upon receipt of a falling (negative going) edge of the ignition control signal EST, switch 22 is commanded to be opened up, thereby causing interruption in the primary current $I_p$. It is well understood by those of ordinary skill in the art of ignition control-that such interruption results in a relatively high voltage being immediately established across secondary winding 20, due to the collapsing magnetic fields associated with the interruption of the primary current. The secondary voltage will continue to rise until reaching a breakdown voltage across gap 30. Secondary current $I_s$ will thereafter discharge across gap 30, as is generally understood in the art. This is shown in FIG. 5C. The current flows from ground, across gap 30, through secondary winding 20, and thereafter through forward-biased diode D1, and sensing resistor 34. The voltage across the gap during this time is shown in FIG. 5D.

In step 84, sensing circuit, namely sensing resistor 34, is operative to measure the secondary current $I_s$ and generate in response thereto secondary current signal $V_s$.

Figure 5E:
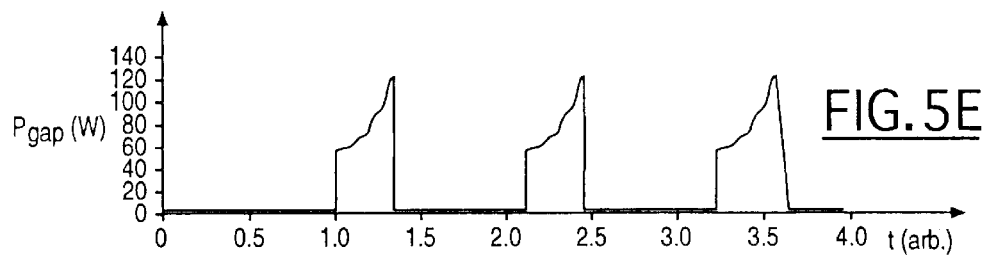

In step 86, the measured secondary current is compared to the selected secondary current threshold, $I_{s\text{-}END}$ to determine whether it is time to end the discharge. If the secondary current, which conventionally commences at a peak level and decays thereafter, has not yet decayed to the secondary current threshold level, then the discharge continues, and control is returned to step 84. As shown in FIG. 5D, the spark gap voltage increases as the discharge continues. This is shown, for example, in FIG. 5D between time =1 and roughly time=1.5. FIG. 5E illustrates the power delivered to gap 30, and thus to the air/fuel mixture in a cylinder (not shown) of engine 12.

When the secondary current in winding 20 decays to the secondary current threshold level $I_{s\text{-}END}$, then control proceeds to step 88. With reference to the schematic diagrams of FIGS. 1, 2A and 2B, this is the time when the SEC_TRIP signal is generated, as described above. The overall multi-charge control strategy, in step 88, determines whether another spark should be initiated during the present compression/combustion cycle. The art is replete with various control strategies, and therefore this aspect will not be addressed in any further detail. When no other sparks are to be initiated, then control is passed to step 90, and the routine is ended. This may involve allowing the remainder of the secondary current, if any, to discharge. However, if the overall multicharge control strategy, which may be implemented in control circuit 36, determines that another spark is to be produced, then the method continues at step 80, wherein ignition coil 16 is recharged. This recharging is shown in exemplary fashion in FIG. 5A, and FIG. 5B, at a time slightly before t=1.5. Note that in FIG. 5C, the first two pulses (i.e., spark events) are terminated when a secondary current level decays to approximately 40 mA, but that for the last spark event (between t=3, and t=4), the secondary current is allowed to decay to zero to substantially dissipate all stored energy (i.e., $I_s$=0 mA). FIG. 5E illustrates an optimized/maximized rate of energy delivery by the inventive ignition system 10 to an air/fuel mixture in a cylinder of engine 12.

It should be understood that although the method in accordance with the present invention, as described herein, involved selecting a secondary current threshold $I_{s\text{-}END}$ for use during one combustion event, it should be understood that the secondary current threshold $I_{s\text{-}END}$ may be selected for each one of the plurality of initial and subsequent sparks during one combustion event.

It should be further understood that steps 80–88 in FIG. 3 are repeated multiple times during a single combustion event (i.e., compression ? combustion cycles) for a particular cylinder to produce a corresponding number of sparks. The method is preferably applied to each cylinder of engine 12. More preferably, the method is applied to each cylinder in sequence on a substantially continuous basis over the operating range of engine 12 (except at relatively high speeds as indicated hereinbefore).

Moreover, it should be recognized that, in the controller-based embodiment show in FIG. 1, the functions/operations performed by controller 38 may be implemented through programmed logic and arithmetic operations, and through other configuration steps (e.g., set/reset bits in a register), known to those of ordinary skill in the art, and requiring no more than application of routine practices of those of ordinary skill in the ignition art, when used in conjunction with the detailed description and drawings set forth herein.

An ignition system in accordance with the present invention provides an increased quality of combustion due to a maximized energy delivery rate to an air/fuel mixture. In a preferred embodiment, a map (i.e., look-up table) provides sufficient resolution necessary to optimize the rate of energy delivery by the ignition system. An alternate reference signal generating embodiment (no "map") provides a higher rate of energy delivery than conventional fixed-time spark duration systems, at a reduced implementation cost.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

What is claimed is:

1. A method of controlling ignition in an internal combustion engine comprising the steps of:
    (A) determining a secondary current threshold as a function of an engine speed parameter and an ambient temperature parameter;
    (B) charging an ignition coil by establishing a primary current through a primary winding of the coil;
    (C) producing a first spark by interrupting the primary current to thereby induce a secondary current in a secondary winding of the coil;
    (D) determining a level of the secondary current;
    (E) recharging the ignition coil by establishing the primary current when the secondary current level reaches the secondary current threshold.

2. The method of claim 1 further comprising the step of:
    producing a second spark by interrupting the primary current.

3. The method of claim 1 wherein said secondary current threshold is further determined as a function of a battery voltage.

4. An ignition system for an internal combustion engine, comprising:
    a control circuit configured to generate an ignition control signal;
    an ignition coil having a primary winding and a secondary winding, said primary winding including a first end coupled to a power supply;
    a switch connected to a second end of said primary winding and configured to selectively cause a primary current to flow through said primary winding in response to said ignition control signal;
    a sensing circuit coupled to said secondary winding configured to generate a secondary current signal representative of a level of secondary current in said secondary winding;

said control circuit being configured to cause said switch to interrupt said primary current wherein a secondary current is established in said secondary winding configured to cause a spark plug coupled to said secondary winding to produce a first spark, said control circuit being responsive to said secondary current signal to generate said ignition control signal in preparation of a second spark when said secondary current reaches a secondary current threshold;

a speed sensor configured to generate a speed signal representative of an operating speed of said engine;

a temperature sensor configured to generate a temperature signal representative of an ambient temperature proximate the engine;

said control circuit including a controller having means for determining said secondary current threshold as a function of said speed signal, said temperature signal, and predetermined data stored in a memory associated with said controller.

5. The system of claim 4 wherein said predetermined data comprises a map including a plurality of secondary current threshold values having a respective engine operating speed value and ambient temperature value associated therewith.

6. The system of claim 4 wherein said determining means is further responsive to a battery voltage signal representative of an output voltage of a battery associated with said engine.

7. The system of claim 4 wherein said control circuit includes a processing circuit having a digital-to-analog converter responsive to said determined secondary current threshold and configured to generate a reference signal corresponding to said secondary current threshold.

8. The system of claim 7 wherein said processing circuit further includes a comparator responsive to said secondary current signal and said reference signal configured to generate a secondary current trip signal indicating that said level of secondary current satisfies said secondary current threshold.

9. The system of claim 8 wherein said controller is responsive to said secondary current trip signal for generating said ignition control signal in preparation of said second spark.

10. An ignition system for an internal combustion engine, comprising:

a control circuit configured to generate an ignition control signal;

an ignition coil having a primary winding and a secondary winding, said primary winding including a first end coupled to a power supply;

a switch connected to a second end of said primary winding and configured to selectively cause a primary current to flow through said primary winding in response to said ignition control signal;

a sensing circuit comprising a resistor coupled to said secondary winding configured to generate a secondary current signal representative of a level of secondary current in said secondary winding;

said control circuit being configured to cause said switch to interrupt said primary current wherein a secondary current is established in said secondary winding configured to cause a spark plug coupled to said secondary winding to produce a first spark, said control circuit being responsive to said secondary current signal to generate said ignition control signal in preparation of a second spark when said secondary current reaches a secondary current threshold, wherein said control circuit includes a processing circuit having a voltage source responsive to an operating speed of said engine and an ambient temperature and configured to generate a reference signal corresponding to said secondary current threshold.

11. The system of claim 10 wherein said processing circuit further includes a comparator responsive to said secondary current signal and said reference signal and configured to generate a secondary current trip signal indicating that said level of secondary current satisfies said secondary current threshold.

12. The system of claim 11 wherein said control circuit includes means responsive to said secondary current trip signal for generating said ignition control signal in preparation of said second spark.

13. A method of controlling ignition in an internal combustion engine comprising the steps of:

(A) determining a secondary current threshold as a function of an engine speed parameter and an ambient temperature parameter;

(B) charging an ignition coil by establishing a primary current through a primary winding of the coil;

(C) discharging the ignition coil to produce a first spark by interrupting the primary current to thereby induce a secondary current in a secondary winding of the coil;

(D) determining a level of the secondary current; and, (E) discontinuing the discharging of the ignition coil by establishing the primary current when the secondary current level determined in step (D) reaches the secondary current threshold determined in step (A).

14. The method of claim 13 further comprising the step of:
discharging the ignition coil to produce a second spark by interrupting the primary current.

* * * * *